United States Patent [19]

Delaney et al.

[11] Patent Number: 5,290,429
[45] Date of Patent: Mar. 1, 1994

[54] CATALYTIC AROMATIC SATURATION IN THE PRESENCE OF HALIDE

[75] Inventors: Dennis D. Delaney, Wilton, Conn.; John W. Ward, Yorba Linda, Calif.

[73] Assignee: Union Oil Company of California, Los Angeles, Calif.

[21] Appl. No.: 981,611

[22] Filed: Nov. 25, 1992

Related U.S. Application Data

[63] Continuation-in-part of Ser. No. 660,335, Feb. 22, 1991, abandoned, which is a continuation-in-part of Ser. No. 528,877, May 25, 1990, Pat. No. 5,135,902.

[51] Int. Cl.$^5$ ............... C10G 45/00; C10G 45/06; C10G 45/08; C10G 45/12
[52] U.S. Cl. ............... 208/145; 208/216 R; 208/216 PP; 208/217; 208/254 H
[58] Field of Search ............... 208/113, 114, 115, 143, 208/145, 216 PP, 217, 254 H, 216 R; 502/210, 228

[56] References Cited

U.S. PATENT DOCUMENTS

| | | | |
|---|---|---|---|
| 3,306,845 | 2/1967 | Poll | 208/254 |
| 3,617,528 | 11/1971 | Hilfman | 208/216 |
| 3,619,414 | 11/1971 | Mills et al. | 208/143 |
| 3,637,484 | 1/1972 | Hansford | 208/143 |
| 3,637,878 | 1/1972 | Hansford | 260/667 |
| 3,703,461 | 11/1972 | Hansford | 208/143 |
| 4,220,557 | 9/1980 | Mickelson | 252/441 |
| 4,582,592 | 4/1986 | Masada et al. | 208/108 |
| 4,582,592 | 4/1986 | Masada et al. | 208/108 |
| 4,686,030 | 8/1987 | Ward | 208/216 PP |
| 4,844,791 | 7/1993 | Moorhead | 208/111 |
| 4,849,093 | 7/1989 | Vauk et al. | 208/143 |
| 4,957,895 | 9/1990 | Nebesh et al. | 502/228 |
| 5,135,902 | 8/1992 | Delaney et al. | 502/210 |

Primary Examiner—R. Bruce Breneman
Assistant Examiner—Bekir L. Yildirim
Attorney, Agent, or Firm—Gregory F. Wirzbicki; Alan H. Thompson

[57] ABSTRACT

An aromatic saturation process is catalyzed under relatively low pressure conditions in the presence of a halide-containing compound. Additive fluoride-containing compounds can be injected into the feedstock just prior to contact of the feedstock with either a fluoride or nonfluoride-containing catalyst. Also, a catalyst utilized in the invention contains Group VIB and/or Group VIII hydrogenation metals, phosphorus and fluoride supported on an amorphous, porous refractory oxide and has a narrow pore size distribution.

44 Claims, No Drawings

CATALYTIC AROMATIC SATURATION IN THE PRESENCE OF HALIDE

RELATED APPLICATIONS

This application is a continuation-in-part application of U.S. patent application Ser. No. 07/660,335, filed Feb. 22, 1991, now abandoned, which is a continuation-in-part of U.S. Ser. No. 528,877, filed May 25, 1990, now U.S. Pat. No. 5,135,902.

BACKGROUND OF THE INVENTION

The invention relates to catalyzed aromatic saturation processes.

In the refining of hydrocarbon-containing feedstocks, it is often necessary to convert hydrocarbon compounds contained in the feedstock to different forms. Typically, particulate catalysts are utilized to promote chemical reactions when feedstocks contact such catalysts under hydrocarbon conversion conditions to produce economically or environmentally upgraded hydrocarbon products. During the course of catalytic refining of hydrocarbons, heterocyclic compounds, including oxygen, nitrogen and sulfur compounds, are removed from hydrocarbon-containing feedstocks. Aromatic compounds contained in a feedstock are catalytically processed in the presence of hydrogen, causing conversion of such aromatic compounds to more saturated forms, i.e., the aromatic compounds are hydrogenated.

An on-going aim of the art is to provide a catalyst having suitably high activity and stability. Activity may be determined by comparing the temperature at which various catalysts must be utilized under otherwise constant processing conditions with the same feedstock so as to produce a given percentage of a given product. The lower activity temperature for a given catalyst, the more active such a catalyst is in relation to a catalyst of higher activity temperature. Alternatively, activity may be determined by comparing the percentages of conversion of feedstock reactants to a given product when various catalysts are utilized under otherwise constant processing conditions with the same feedstock. The higher the percentage of converted product for a given catalyst, the more active such a catalyst is in relation to a catalyst converting a lower percentage of the same feedstock reactants to the same product. As a catalyst deactivates during processing, its stability (i.e., deactivation resistance) is generally measured in terms of the change in temperature required per unit of time to maintain a given percentage of product, or alternatively, in terms of the change in percentage of product per unit of time. The lower the change in percentage of product per time unit for a given catalyst, the more stable such a catalyst is in relation to a catalyst yielding a greater change.

Recent legislation has increased the demands for refiners to reduce the content of environmentally undesirable aromatic-containing compounds in fuel products and solvents such as diesel fuels and solvents. Catalytic aromatic saturation is a useful refining process for such reduction. Aromatic saturation involves the conversion of aromatic-containing compounds, into environmentally acceptable, more saturated hydrocarbon-containing product compounds. Typically, aromatic-containing compounds such as substituted mono-aromatics and the like are saturated and thus converted to naphthenes and other related saturated hydrocarbon product compounds. Several hydrotreating catalysts have been utilized to promote such reactions. A typical catalyst contains hydrogenation metals supported on a porous refractory oxide. Such a catalyst provides suitable aromatic saturation activity (i.e., percentage conversion of aromatic compounds to products containing a greater hydrogen to carbon ratio, e.g., more saturated products); however, the search continues for catalysts and processes exhibiting improved activity and stability.

SUMMARY OF THE INVENTION

The invention provides a catalytic process for saturating aromatic compounds contained in a hydrocarbon-containing feedstock in the presence of at least one halide-containing compound. The halide-containing compound, preferably a fluoride-containing component, can be either added with the reactants or contained on the catalyst, or the combination thereof. In one embodiment, the process involves contacting a catalyst with an additive halide-containing compound (i.e., "additive halide") which is introduced into an aromatic-containing feed prior to (or concurrently with) the feed contacting the catalyst. In another embodiment, no additive halide is introduced into the feed; however, the catalyst itself can contain at least one halide component. During aromatic saturation processing, the concentration of halide component contained on the halide-containing catalyst may be diminished, thus, the additive halide-containing compound can also be introduced into the aromatic-containing feed passing over the halide-containing catalyst.

Ordinarily the catalyst comprises at least one hydrogenation metal component on a support containing an porous refractory oxide. A preferred catalyst contains hydrogenation metal components selected from Group VIB and Group VIII and a halide component supported on a porous refractory oxide. The support usually contains an amorphous material such as alumina, but may contain a crystalline molecular sieve. The invention preferably provides a catalyst containing cobalt or nickel, molybdenum or tungsten, phosphorus and fluoride, and most preferably, consisting of nickel, tungsten, phosphorus, and fluoride components on a porous, amorphous refractory support having a relatively narrow pore size distribution. A preferred catalyst has a mole ratio of molybdenum or tungsten to nickel which is less than 7 to 1. Also, a preferred pore size distribution of the catalyst comprises at least 75 percent of the total pore volume in pores of diameter in the range from about 50 to about 130 angstroms, and less than 10 percent of the pore volume in pores of diameter greater than 130 angstroms. The median pore diameter of the catalyst is usually in the range of about 60 to about 100 angstroms. A preferred catalyst is prepared by impregnating the above-mentioned hydrogenation metals, phosphorus and/or the halide compound onto a gamma alumina-containing support having at least 75 percent of the total pore volume within about 20 angstroms above and 20 angstroms below a median pore diameter from about 65 to about 80 angstroms.

The catalyst is typically contacted under aromatic saturation conditions with a feedstock containing at least about 10 volume percent aromatic compounds, typically in the form of mono-aromatic, di-aromatics or tri-aromatics, to produce hydrocarbon-containing compounds more saturated than those of the feedstock. In particular, a feedstock containing substantially all components boiling in a diesel range, e.g., from 140° C. to 371° C., and further containing aromatic compounds, can be converted to hydrocarbon-containing products having a reduced aromatic content.

Advantages derived from such a process include operating the aromatic saturation process at substantially lower temperatures or saturating a greater percentage of aromatics than comparable processes, and extending the processing term before shut down.

DETAILED DESCRIPTION OF THE INVENTION

The invention is directed to a catalyst containing hydrogenation metal and halide components, or a novel process catalyzed in the presence of a halide compound for converting a hydrocarbon-containing feedstock to upgraded hydrocarbon products. More specifically, the invention relates to a process wherein aromatic saturation reactions are promoted by a catalyst comprising at least one hydrogenation metal component and a halide component supported on a porous refractory oxide, or wherein the aromatic saturation reactions are promoted by either a halide-containing or a nonhalide-containing catalyst in the presence of at least one halide compound injected prior to contact of the feedstock with the catalyst. Although the catalyst may contain at least one noble metal, the catalyst usually comprises at least one Group VIB and/or Group VIII (preferably non-noble) metal component and/or at least one phosphorus component and at least one fluoride component supported on a porous refractory oxide, usually an amorphous refractory oxide having a relatively narrow pore size distribution such that the catalyst has at least 70 percent of the total pore volume in pores of diameter from about 60 to about 100 angstroms.

Among the useful catalyst materials in the present invention are the refractory oxide supports disclosed in U.S. Pat. Nos. 4,686,030, 4,886,582, 4,846,961, 4,401,556 and 4,849,093, as well as the amorphous matrix supports disclosed in U.S. Pat. No. 4,844,791, all of which patents are herein incorporated by reference in their entireties. Still other catalyst materials useful in the present invention are the catalysts and supports disclosed in U.S. Pat. Nos. 3,637,484, 3,703,461, 3,637,878, 4,610,973 and 4,419,271, herein incorporated by reference in their entireties. The latter patents describe catalysts containing dispersions of silica-alumina in an alumina matrix, and the combination of at least one zeolite with the dispersion. However, in contrast to the main teachings in these patents wherein the catalysts are employed to promote reactions involving substantial cracking of the reactants, particularly hydrocracking of feedstock components boiling above 371° C. to products boiling below 371° C., the catalysts in the present invention are utilized to promote aromatic saturation reactions involving essentially no cracking of the feedstock components, e.g., less than 5 percent cracking of the feedstock components. More specifically, in the aromatic saturation reactions of the present invention, the homocyclic aromatic ring or rings in a given aromatic-containing compound of the feedstock is (are) not substantially cracked or opened, nor does substantial cracking occur at the non-aromatic portions of such compounds. Also, the aromatic saturation process of the present invention yields product components having increased molecular weight, primarily due to the increase in hydrogen content of the products as a result of hydrogenative saturation of the aromatic-containing compounds of the feedstock.

Crystalline and noncrystalline materials can be contained in the catalyst support materials. Aluminosilicates such as zeolites may be contained in the refractory oxide catalyst supports. Combinations of crystalline materials such as zeolitic and nonzeolitic molecular sieves with or without amorphous refractory oxides can further contain conventional binder materials. The suitable zeolites for use herein include crystalline aluminosilicate molecular sieves, including naturally-occurring and synthetic crystalline aluminosilicate zeolites known in the art. Examples are faujasite, mordenite, erionite, Zeolite-Y, Zeolite-X, Zeolite L, Zeolite Omega, Zeolite ZSM-4, Zeolite beta, and their modifications. Such modifications include, for example, replacement of alkali metals in the zeolites with multivalent metal-containing cations, hydrogen ions, or hydrogen ion precursors (e.g., ammonium ion), by methods such as ion-exchange, to reduce the alkali metals to less than 1 weight percent, preferably less than 0.5 weight percent, and most preferably less than 0.3 weight percent, calculated as the alkali metal oxides.

In addition to the zeolites referred to above, many other crystalline aluminosilicate zeolites in their non alkali metal forms may be utilized in the catalyst support described herein. Preferred zeolites contain at least 50 percent of their pore volume in pores of diameter greater than 8 Angstroms, with Zeolite Y (and its modifications) being preferred. Also preferred are zeolites that have been ion-exchanged and then steam stabilized.

However, preferred catalyst supports employed in the present invention are devoid of zeolites and other crystalline materials, particularly when used in the preferred catalyst which is essentially free of Group VIB and Group VIII metals other than tungsten and nickel, respectively. More preferably the catalyst of the present invention is essentially free of supported metal components other than nickel and tungsten, and essentially free of supported nonmetal components other than phosphorus and fluoride. The preferred catalyst of the invention consists essentially of nickel, tungsten, phosphorus and fluoride components supported on the herein described supports, particularly an amorphous refractory oxide.

The preferred supports provide a catalyst having a narrow pore size distribution wherein at least about 75 percent of its total pore volume is in pores of diameter from about 50 to about 130 angstroms, and preferably at least about 60 percent of the total pore volume is in pores of diameter within about 20 angstroms above or below the median pore diameter of the catalyst, as measured by mercury porosimetry. Preferably, the catalyst is essentially free of crystalline support materials, and, more particularly, is essentially free of a crystalline molecular sieve.

In a preferred embodiment, a catalyst containing an amorphous refractory oxide, such as alumina, has a median pore diameter from about 50 to about 110 angstroms, usually about 55 to about 100 angstroms, and preferably about 60 to about 95 angstroms. In the most highly preferred embodiment, the median pore diameter of the catalyst is about 70 to about 90 angstroms. The catalyst also has a narrow pore size distribution wherein at least about 50 percent, preferably at least about 65 percent, and more preferably at least about 75 percent of the total pore volume is in pores distributed over a narrow range of about 20 angstroms above to about 20 angstroms below the median pore diameter.

In the preparation of the catalysts of the present invention, the pore size distribution of the amorphous support particles may be similar to that of the final catalyst, but such is not necessary or critical. The support material is typically comprised of such amorphous inorganic refractory oxides as silica, magnesia, silica-magnesia, zirconia, silica-zirconia, titania, silica-titania, alumina, silica-alumina, etc. with supports containing gamma, theta, delta and/or eta alumina, and mixtures thereof, being highly preferred, and with gamma alumina being the most highly preferred. Preferably, the supports are essentially free of crystalline materials and, most particularly, are essentially free of crystalline molecular sieve materials. Preferred support particles having the preferred physical characteristics disclosed herein are available from AKZO-Chemie, and Criterion Catalyst Company. Mixtures of the foregoing oxides are also contemplated, especially when prepared as homogeneously as possible.

The amorphous refractory oxide support material is usually prepared in the form of shaped particulates, with the preferred method being to extrude a precursor of the desired support through a die having openings therein of desired size and shape, after which the extruded matter is cut into extrudates of desired length. The support particles may also be prepared by mulling (or pulverizing) a precalcined amorphous refractory oxide to a particle size less than about 100 microns and extruding the material.

The extruded particles may have any cross-sectional shape, i.e., symmetrical or asymmetrical, but most often have a cross-sectional shape, preferably a cylindrical or polylobal shape. The cross-sectional diameter of the particles is usually about 1/40 to about ⅛ inch, preferably about 1/32 to about 1/12 inch, and most preferably about 1/24 to about 1/15 inch. Among the preferred particulates are those having quadralobal cross-sectional shapes resembling that of a four leaf clover, including asymmetrical shapes as well as symmetrical shapes such as in FIG. 10 of U.S. Pat. No. 4,028,227. Other preferred catalyst configurations are cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.05 inch. Other particulates having ring and monolith shapes are available from Davison Chemical Company, a division of W. R. Grace & Company, as disclosed in U.S. Pat. No.4,510,261.

Typical characteristics of the amorphous refractory oxide supports utilized herein are a total pore volume, median pore diameter and surface area large enough to provide substantial space and area to deposit the active components, e.g., the metal, phosphorus and fluoride components. The total pore volume of the support, as measured by conventional mercury porosimeter methods, is usually about 0.2 to about 2.0 cc/gram, preferably about 0.25 to about 1.0 cc/gram, and most preferably about 0.3 to about 0.9 cc/gram. Surface area (as measured by the B.E.T. method) is typically above about 100 m²/gram, and preferably about 125 m²/gram to about 400 m²/gram. In the broadest sense, the support has a median pore diameter greater than about 50 angstroms, and preferably about 60 to about 100, and most preferably 65 to about 80, and most preferably still, about 70 to about 80 angstroms. The support has a narrow pore size distribution wherein at least about 75 percent, and preferably at least 80 percent of the total pore volume is in pores of diameter from about 20 angstroms above to about 20 angstroms below the median pore diameter. The support preferably has less than about 10 percent of the total pore volume in pores of diameter less than about 60 angstroms and less than about 5 percent of the total pore volume in pores of diameter less than about 50 angstroms, and less than about 10 percent, preferably less than 8 percent of the total pore volume in pores of diameter greater than about 90 angstroms. Physical characteristics of several amorphous refractory oxide supports utilized in preparation of a catalyst employed in the process of the invention are summarized in Table A as follows:

TABLE A

| Pore Diameter Angstroms | Support X % Pore Volume | Support Y % Pore Volume | Support Z % Pore Volume |
| --- | --- | --- | --- |
| 40-50 | — | 1.6 | 4.0 |
| <50 | 0.8 | 1.9 | — |
| 50-60 | 5.7 | 4.2 | 16.0 |
| 60-70 | 16.4 | 22.5 | 46.0 |
| 70-80 | 29.9 | 61.1 | 28.0 |
| >80 | — | 10.3 | 6.0 |
| 80-90 | 24.6 | 4.1 | — |
| >90 | — | 6.2 | — |
| 90-100 | 9.8 | 0.7 | — |
| 100-110 | 6.6 | 0.6 | — |
| 110-120 | 1.6 | 0.4 | — |
| 120-130 | 0.8 | 0.4 | — |
| >130 | 5.7 | 4.1 | — |
| PORE VOLUME cc/gram (Merc. Poros.) | 0.61 | 0.61 | 0.58 |
| MEDIAN PORE DIAMETER (Merc. Poros.) | 88 | 73 | 67 |

To prepare the catalyst, the support material is compounded, as by a single impregnation or multiple impregnations of a calcined amorphous refractory oxide support particles, with precursors of phosphorus and fluoride and one or more precursors of a hydrogenation metal component, such as a Group VIB or Group VIII metal component, preferably both catalytically active nickel and tungsten hydrogenation metal components. The impregnation may be accomplished by several methods, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a large volume of the impregnation solution, and yet one more method is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

Impregnation of Group VIB metal, Group VIII metal, phosphorus and fluoride components is usually accomplished using a single mixed impregnation solution, although such materials may also be added partially in sequential impregnations with intervening drying and/or calcining.

Most Group VIB and Group VIII metal compounds are useful for impregnation or comulling. Preferred nickel and tungsten compounds include nickel nitrate, nickel acetate, nickel chloride, nickel carbonate and ammonium metatungstate, ammonium para tungstate and tungstenic acid. Preferred phosphorus compounds comprise an acid of phosphorus, such as meta-phosphoric acid, pyrophosphoric acid, phosphorous acid, but preferably orthophosphoric acid, or a precursor of an acid of phosphorus, that is, a phosphorus-containing compound capable of forming a compound containing at least one acidic hydrogen atom when in the presence of water, such as phosphorus oxide, phosphorus, or the like.

Several methods can be employed to incorporate the halide component into the catalyst, including impregnation, comulling or contact of the support or catalyst with an elemental halogen-containing gas. Several water-soluble or partially water-soluble salts containing halide precursors for the finished halide-containing supports or catalysts can be impregnated onto the supports disclosed herein. For example, fluorides such as ammonium fluoride, cobalt fluoride, nickel fluoride, cobalt or nickel fluosilicate (the fluosilicates being impregnated onto supports or catalysts by methods as disclosed in U.S. Pat. No. 4,220,557, incorporated by reference herein in its entirety), hydrofluoric acid, ammonium fluosilicates, and the like, can be impregnated onto supports described herein and calcined. The supports described herein can be contacted with elemental halogen-containing gas (by methods disclosed in U.S. Pat. No. 4,844,791, incorporated by reference herein in its entirety) to produce catalysts containing "non-hydrolyzable halogen components," particularly fluoride-containing components. If the metal, phosphorus and fluoride precursors are incorporated by impregnation, a subsequent or second calcination, as for example at temperatures between about 370° C. and about 650° C., converts the metal and phosphorus to their respective oxide forms and fluoride components in forms such as monoatomic fluoride, aluminum fluoride or alumino-oxyfluoride. In some cases, calcinations may follow each impregnation of individual active metals and non-metals. Such multiple impregnation-calcination procedures, however, may be avoided in alternative embodiments of the invention, as for example, by comulling all the active metals, phosphorus and fluoride with the support materials rather than impregnating the metals thereon. In comulling, precursors of the support materials, usually in a hydrated or gel form, are admixed with precursors of the active metal components, either in solid form or in solution, to produce a paste suitable for shaping by known methods, e.g., pelleting, extrusion, etc. A subsequent calcination yields a catalyst containing the active hydrogenation metals and phosphorus in their respective oxide forms, and fluoride components in forms such as monoatomic fluoride, aluminum fluoride or alumino-oxyfluoride.

When the catalyst is prepared by the foregoing or equivalent methods, at least one active metal component (preferably nickel and tungsten) having hydrogenation activity, at least one phosphorus component and at least one fluoride component are introduced into the preferred catalyst of the invention. The catalyst typically contains about 0.5 to about 10 percent, usually from 1 to 8 percent, and preferably from 2 to 6 percent by weight of Group VIII metal, calculated as the monoxide, (such as cobalt and/or nickel, calculated as NiO or CoO), and/or about 1 to about 40 percent, usually from about 3 to about 28 percent, and preferably from 8 to 26 percent by weight of Group VIB metal, calculated as the trioxide, (such as tungsten and/or molybdenum, calculated as $WO_3$ or $MoO_3$). A highly preferred catalyst useful herein contains about 17 to about 27 weight percent, and more preferably about 17 to about 23 weight percent of tungsten metal components, calculated as $WO_3$, and from about 0.5 to about 8 weight percent of nickel metal components, calculated as NiO. The catalyst preferably contains a phosphorus component, ordinarily supported on the catalyst, which phosphorus component may provide acid properties to the catalyst or act as a catalytic promoter. Typically, the catalyst contains about 1 to about 15 weight percent of phosphorus components, calculated as $P_2O_5$. When the catalyst of the invention contains a halide, particularly fluoride, it typically contains the fluoride component in a concentration of about 0.01 to about 10, and preferably about 0.1 to about 6 weight percent, calculated as F.

A tungsten-containing catalyst of the invention requires less tungsten, on a mole basis, than comparative molybdenum-containing catalysts. The mole ratio of tungsten-to-nickel on the finished nickel/tungsten or nickel/tungsten/phosphorus or nickel/tungsten/phosphorus/fluoride catalyst of the invention, calculated as the metal oxides (i.e., $WO_3$, NiO), is usually less than 10 to 1, preferably less than about 7 to 1, and more preferably less than 6 to 1. Typically the tungsten-to-nickel mole ratio is in the range from about 10 to 1 to about 3 to 1. As can be seen hereinafter in the Example, such a tungsten-to-nickel mole ratio provides superior aromatic saturation activity for the catalyst of the invention as compared to a comparable nickel/molybdenum/phosphorus catalyst of essentially the same molybdenum-to-nickel mole ratio, essentially the same amounts of nickel and phosphorus, and prepared from the same support. The tungsten-containing catalyst usually contains a molar concentration of tungsten which is at least about 25 percent less than the molybdenum concentration contained on the above-described comparable molybdenum-containing catalyst.

The physical characteristics of the catalyst usually vary from those of the support particles by less than about 25 percent. Ordinarily, the catalyst is prepared so as to have a narrow pore size distribution wherein at least about 75 percent, preferably at least about 80 percent, and most preferably at least about 85 percent of the total pore volume is in pores of diameter from about 50 to about 130 angstroms. Ordinarily the catalyst has less than about 10 percent of the total pore volume in pores of diameter below about 50 angstroms and preferably less than about 0.05 cc/gram. Also, the catalyst has less than about 10 percent of the total pore volume in pores of diameter greater than about 130 angstroms, preferably less than about 0.05 cc/gram in such range; and preferably less than 10 percent of the total pore volume is in pores of diameter greater than 110 angstroms, and more preferably less than 10 percent of the total pore volume in pores of diameter greater than 100 angstroms; and most preferably, less than about 15 percent of the total pore volume in pores of diameter greater than about 90 angstroms.

Another porosity feature of the catalyst is the narrow pore size distribution for pores of diameter greater than the median pore diameter. The median pore diameter of the catalyst usually lies in the range from about 50 to about 115 angstroms, preferably 55 to about 100 angstroms, and more preferably about 60 to about 95 angstroms, and most preferably about 70 to about 90 angstroms. Ordinarily, at least about 40 percent of the total pore volume is in pores of diameter between the median pore diameter and less than about 90 angstroms, preferably less than about 50 angstroms, and most preferably less than about 25 angstroms above the median pore diameter. With respect to small pores, at least about 40 percent of the total pore volume is in pores of diameter between the median pore diameter and less than about 50, and preferably less than about 25 angstroms below the median pore diameter.

Generally, the supports and catalysts employed in the process of the invention have steep-sloped pore size distribution curves. As used herein, a steeper slope is a negative slope of greater absolute value than the absolute value of the negative slope of a comparative support or catalyst. The slope, as defined herein, of a pore size distribution curve, derived, for example, from mercury porosimeter testing techniques, [plotting cumulative pore volume (ordinate) vs. pore diameter (logarithmic scale abscissal)], is for a line drawn through a point on the curve representing 40 percent of the total pore volume in pores of diameter above the median pore diameter and through a point on the curve representing 40 percent of the total pore volume in pores of diameter below the median pore diameter.

Other physical properties of the final catalyst typically include a total pore volume of about 0.20 to about 1.0 cc/gram, and preferably about 0.20 to about 0.60 cc/gram and most preferably about 0.25 to about 0.5 cc/gram and a surface area greater than about 100 $m^2$/gram, and preferably between about 100 and 400 $m^2$/gram with both properties determined by the conventional methods previously disclosed herein.

One preferred catalyst employed in the invention contains about 2 to about 6 weight percent of nickel components, calculated as NiO, from about 10 to about 35 weight percent of tungsten components, calculated as $WO_3$, about 3 to about 15 weight percent of phosphorus components, calculated as $P_2O_5$, and about 0.1 to about 8.0 weight percent of fluoride components, calculated as F, on a porous refractory oxide support comprising gamma alumina. Physical characteristics of this catalyst include a total pore volume of about 0.25 to about 0.50 cc/gram, a surface area from about 100 to about 250 $m^2$/gram and a median pore diameter in the range of about 70 to about 110 angstroms.

A highly preferred catalyst employed in the invention contains about 2 to about 6 weight percent of nickel component, calculated as NiO, from about 15 to about 23 weight percent of tungsten components, calculated as $WO_3$, about 3 to about 10 weight percent of phosphorus components, calculated as $P_2O_5$, and about 0.5 to about 6.0 weight percent of fluoride components, calculated as F, on a support containing gamma alumina. This catalyst has a surface area from about 125 to about 250 $m^2$/gram, a median pore diameter from about 60 to about 90 angstroms, and a pore size distribution wherein at least about 70 percent of the pore volume is in pores of diameter in the range from about 20 angstroms above to about 20 angstroms below the median pore diameter.

Another highly preferred catalyst employed in the invention contains about 2 to about 6 weight percent of cobalt or nickel component, calculated as the monoxide from about 17 to about 27 weight percent of molybdenum components, calculated as $MO_3$, about 1 to about 10 weight percent of phosphorus components, calculated as $P_2O_5$, and about 0.5 to about 6.0 weight percent of fluoride components, calculated as F, on a support containing gamma alumina. This catalyst has a surface area from about 125 to about 250 $m^2$/gram, a median pore diameter from about 60 to about 100 angstroms, and a pore size distribution wherein at least about 50, and preferably 70 percent of the pore volume is in pores of diameter in the range from about 20 angstroms above to about 20 angstroms below the median pore diameter.

Catalysts are activated in accordance with methods suited to a hydrocarbon conversion process, particularly to an aromatic saturation process. Most of the catalysts used in the process of the invention are more active, sometimes even far more active, in a sulfided form than in the oxide form in which they are generally prepared. Accordingly, the catalyst used herein may be sulfided prior to use by any known method (in which case the procedure is termed "presulfiding"), for example, by passing a sulfiding agent over the catalyst prepared in the calcined form. Temperatures between 150° C. and 370° C. and gaseous space velocities between about 140 and 500 v/v/hr are generally employed, and this treatment is usually continued for at least about two hours. A mixture of hydrogen and one or more components selected from the group consisting of sulfur vapor and sulfur compounds (e.g., lower molecular weight thiols, organic sulfides, and especially $H_2S$) is suitable for presulfiding. Generally speaking, the relative proportion of sulfiding compounds in the presulfiding mixture is not critical, with any proportion of sulfur ranging between 0.01 and 15 percent by volume, calculated as S, being adequate. Also, liquid sulfiding agents, such as dimethyl disulfide and the like, may be used for presulfiding.

If the catalyst is to be used in a sulfided form, it is preferred that a presulfiding procedure be employed. However, since the hydrocarbon conversion process may be employed to upgrade sulfur-containing hydrocarbons (i.e., hydrodesulfurization), one may, as an alternative, accomplish the sulfiding in situ with sulfur-containing hydrocarbon oils, particularly those containing sufficient sulfur to maintain the catalyst in the sulfided form. In another alternative form, the catalyst may be sulfided ex situ by treatment with a sulfur-containing medium prior to loading into a reactor vessel.

Catalysts of the invention may be employed in any of several hydrocarbon conversion processes wherein catalytic composites containing porous support material are known to be catalytically effective. Typical processes include hydrogenation, alkylation, polymerization, oxidation, desulfurization, denitrogenation, isomerization, reforming, and the like.

The term "hydrocarbon conversion" refers to any reaction wherein a hydrocarbon compound changes chemical composition. As used herein, "hydrocarbon" refers to a compound which consists of hydrogen and carbon, and "hydrocarbon-containing feedstock" refers to any charge stock which contains greater than about 90 weight percent carbon and hydrogen, calculated as the elements. Contemplated for treatment by the process of the invention are hydrocarbon-containing liquids and gases, including broadly all liquid, liquid/vapor and vapor hydrocarbon mixtures including petroleum oils and synthetic crudes. Among the typical feedstocks contemplated are top crudes, vacuum and atmospheric residual fractions, light and heavy atmospheric and vacuum distillate oils, hydrocarbon distillate fractions, shale oils, and oils from bituminous sands and coal compositions and the like. Hydrocarbon compounds converted by the process of the invention include all forms, such as aliphatic, cycloaliphatic, olefinic, acetylenic, aromatic—including alkaryl and arylalkyl aromatic compounds and derivatives thereof—in addition to organometallic, organo-oxygen, organonitrogen, and organosulfur compounds, particularly those found in conventional hydrocarbon-containing feedstocks. Typical aromatic compounds contained in the feedstocks include monoaromatic, di-aromatic, and triaromatics (as determined by Fluorescent Indicator Adsorption, F.I.A.), particularly those normally boiling below about 343° C. For use herein, typical hydrocarbon distillate fractions, or mixtures thereof, contain at least about 10 weight percent of hydrocarbon compounds having at least one unsaturated carbon-to-carbon bond.

Generally, a substantial proportion (i.e., at least about 90 volume percent) of hydrocarbon-containing feedstocks such as gas oils and the like, boil at a temperature less than about 595° C., preferably less than about 565° C., and usually boil entirely within the range of about 38° C. to about 595° C. A preferred feedstock processed in the present invention contains a substantial proportion of (and in some cases, essentially all) feedstock components boiling at less than 371° C., particularly a diesel fraction.

The catalyst may be employed as either a fixed, slurried or fluidized bed (but most usually a fixed bed) of particulates in a suitable reactor vessel wherein a hydrocarbon-containing feedstock (liquid, gaseous, or mixtures thereof) to be treated is introduced and subjected to hydrocarbon conversion conditions including an elevated total pressure, temperature, a hydrogen partial pressure, and optionally an injected halide compound so as to effect the desired degree of conversion.

Typical hydrocarbon conversion operation conditions include a temperature from about 50° C. to about 500° C., a pressure from about 50 p.s.i.g. to about 4,000 p.s.i.g., (preferably less than 700 p.s.i.g.) and a liquid hourly space velocity of about 0.05 to about 25 vol/vol-hr. In the presence of hydrogen, the hydrocarbon-containing feedstock contacts the catalyst under hydroprocessing conditions including a hydrogen recycle rate usually about 1,000 to about 15,000, and preferably about 1,000 to about 6,000 standard cubic feet per barrel (scf/bbl). Preferred conditions for saturation of hydrocarbon compounds having at least one unsaturated carbon-to-carbon bond include a temperature from about 200° C. to about 400° C., a hydrogen partial pressure usually about 200 to about 3,000 p.s.i.g., but preferably about 350 to about 650 p.s.i.g. at a space velocity usually about 0.5 to less than 5.0 LHSV so as to effect the desired degree of saturation.

Although virtually any hydrocarbon feedstock containing a substantial proportion of components boiling in the diesel range may be treated by aromatic saturation, the process is particularly suited to treating a diesel fraction ordinarily containing at least 5 weight percent of aromatic compounds, and usually in the range from 10 to 80 weight percent of aromatics. The diesel fraction is referred to herein as that hydrocarbon-containing fraction boiling in the range from 140° C. to 371° C. Preferably, the diesel fraction contains about 20 to about 60 weight percent of aromatics, and most preferably about 25 to about 50 weight percent. Sulfur is usually present in such fractions in all forms, including paraffinic and heterocyclic, in a proportion exceeding 0.05 weight percent and often exceeding 0.1 weight percent, although sulfur usually does not exceed about 3.0 weight percent and often less than 1.0 weight percent, calculated as S. The feedstock may contain a relatively low sulfur content, such as less than about 0.75 weight percent and sometimes less than 0.5 weight percent; however, the sulfur content of the feedstock is usually sufficient to maintain the catalyst in the sulfided form which is normally greater than 20 ppmw and often greater than 50 ppmw, calculated as S. Frequently, the feedstock contains undesirable proportions of nitrogen, usually in a concentration greater than about 0.01 weight percent and often between about 0.01 and 1.0 weight percent. Usually, the nitrogen present is in a concentration not exceeding about 1.0 weight percent and often between about 0.01 and 1.0 weight percent, calculated as N. Although it is highly preferred that the feedstock contain essentially no nitrogen (i.e., less than 100 ppmw, calculated as N), a relatively low content of nitrogen is commonly tolerated—about 100 ppmw to about 300 ppmw.

In a preferred embodiment for saturating aromatic-containing compounds, both the hydrocarbon-containing feedstocks and the resulting products typically comprise fractions that boil in the diesel range. The process is preferably conducted in a temperature range from about 250° C. to about 382° C., a total pressure in the range from about 300 to about 1,800 p.s.i.g. but more preferably a maximum pressure less than 700 p.s.i.g., a liquid hourly space velocity of about 0.5 to about 3.0 (LHSV), and a hydrogen rate of about 3,000 to about 5,000 scf/bbl. It is highly preferred that the process is conducted at a total pressure at the inlet of the reactor which is greater than 300 to less than 800 p.s.i.g. and most preferably greater than 350 to less than 650 p.s.i.g. Aromatic saturation requires the conversion of at least 10, and preferably at least 25 volume percent of the feedstock aromatic hydrocarbons boiling at less than about 371° C. to an aromatic-containing product boiling below 371° C. from a single pass of the feedstock. Because the conversion of unsaturated compounds to saturates can become equilibrium limited, one is thermodynamically limited to a maximum temperature which favors the production of saturated products over unsaturates. In general, this maximum temperature is between about 370° to 382° C. Temperatures above that region tend to force the equilibrium towards unsaturated compounds, whereas lower temperatures favor the desired production of saturated compounds. Also, at a hydrogen partial pressure in the range from 400 to 650 p.s.i.g. at the inlet of a reactor containing the catalyst of the invention, the halide-containing compound, particularly fluoride, is not substantially removed from the catalyst during processing. Typically, less than 10 weight percent, preferably less than 5 weight percent, and most preferably, essentially none (i.e., less than 1 weight percent) of the total weight of fluoride contained on the catalyst, calculated as F, is lost during processing.

The results obtained in any particular process will depend upon the nature of the catalyst, the nature of the feedstock, and the severity of the operating conditions. It is preferred that at least 15 volume percent and, more preferably, at least 20 volume percent of the unsaturated components contained in the feedstock is converted to saturated products in a single pass; however, the maximum conversion is usually greater than 50 volume percent and often greater than 65 volume percent. It is highly preferred that the aromatic compounds contained in the feedstock are reduced, in a single pass, to less than 10 volume percent of the effluent, and the sulfur content of the feedstock is reduced to less than about 500 ppmw, calculated as S.

Furthermore, in the aromatic saturation process of the invention where cracking reactions are minimal, the boiling point range of the feedstock compared to the boiling point range of the products is not substantially changed, and often the process involves essentially no change in the boiling point. Likewise, the overall molecular weight of the product as compared to the feedstock remains unchanged during the conversion of reactants to products. In some cases, the addition of hydrogen to the reactants provides products of increased overall molecular weight.

Ordinarily a reactor that is part of a hydroprocessing unit, or units, in a refinery is utilized. In the saturation of hydrocarbon compounds having at least one unsaturated carbon-to-carbon bond in a feedstock, the catalyst is usually maintained as a fixed bed with the feedstock passing downwardly once therethrough, either in series or parallel. If the feedstock is unusually high in organonitrogen and organosulfur compounds, it may be pretreated, integrally or separately, using a hydrotreating catalyst. A preferred process utilizes the catalyst of the invention in a single reactor for concurrent hydrotreating and aromatic saturation, or in a process wherein the catalyst of the invention is located in a separate reactor downstream of a hydrotreating reactor. After pretreatment, the total pressure at the inlet in a downstream reactor is usually increased when the hydrotreated effluent is contacted with a catalyst of the present invention under aromatic saturation conditions.

Generally, the hydrogen partial pressure maintained at the reactor inlet during hydroprocessing is more than 50 percent of the total pressure. Usually, for once-through operation, the hydrogen partial pressure is at least about 85 percent of the total pressure while, for recycle operation, the hydrogen partial pressure is somewhat lower, i.e., usually between 70 and 85 percent of the total pressure.

A hydroprocess of the invention may include either serial or simultaneous desulfurization, denitrogenation and saturation of components of a feedstock. Simultaneous desulfurization, denitrogenation and aromatic saturation, as used herein, involves contacting a hydrocarbon-containing feedstock with the catalyst disclosed herein under conditions effecting (1) a lower sulfur and/or nitrogen content in the effluent and (2) a lower percentage of aromatic-containing products in the effluent as compared to the feedstock. Typical hydroprocessing conditions above include a temperature from about 200° C. to about 400° C., a total pressure from about 400 to about 2,000 p.s.i.g., a space velocity of about 0.1 to about 3.0, and a hydrogen rate from about 2,000 to about 6,000 scf/bbl. Preferred conditions include a partial pressure of hydrogen less than 700 p.s.i.g., and more preferably in the range from about 350 to about 650 p.s.i.g. Serial desulfurization and denitrogenation of a feedstock involves either removing sulfur and nitrogen from the feedstock prior to contact of the catalyst disclosed herein or removing sulfur and nitrogen from the effluent of such a process.

Halide-containing compounds, which, pursuant to the process of the invention, are introduced into the feedstock prior to or concurrently with the feedstock contacting the catalysts described herein in the reaction zone, are herein referred to as additive halide-containing compounds. The additive halide-containing compounds also include precursors thereof. Additive halide-containing compounds (also referred to as additive halides) useful in the process of the invention particularly include organofluorine compounds, such as those described in U.S. Pat. No. 4,582,592, which is incorporated by reference herein in its entirety. For example, organic 1 monofluorides, organic difluorides, trifluorides, tetrafluorides, and the like, are included such as alkyl, aryl, alkaryl and aralkyl fluorides, e.g., difluorethane, tetrafluoroethane, hexafluorethane, difluoropropane, tetrafluorohexane, trifluorotoluene, fluorotoluene, benzylfluoride, benzyldifluoride, perfluorocarbons, and the like. Also, fluorine-containing compounds commercially available under the tradename "freon" are suitable.

Typically, the amount of additive halide-containing compound introduced into the feedstock is controlled at levels greater than about 50 ppmw, calculated as the monoatomic halide (for instance, as F), and usually in the range from about 100 ppmw to about 1250 ppmw, and ordinarily not greater than about 1500 ppmw. A preferred range of fluoride is between about 150 ppmw and 800 ppmw. The invention is further illustrated by the following examples which are illustrative of specific modes of practicing the invention and are not intended as limiting the scope of the invention defined by the appended claims.

EXAMPLE I

Catalysts are prepared in accordance with the invention. The first catalyst, Catalyst A, is prepared by extruding a gamma alumina-containing material through a die. The extruded matter, having a cross-sectional shape of a four-leaf clover, is broken into particulates, dried, and calcined at 625° C. ±30° C. Gamma alumina support particulates, having a nominal 1/20 inch cross-sectional width (measured by maximum distance across two such clover leaves) and the porosity characteristics described hereinbefore as Support Y in Table A, are then impregnated with nickel nitrate hexahydrate and ammonium megatungstate dissolved in a dilute aqueous phosphoric acid solution so as to incorporate into the catalyst, after drying and a calcination temperature of approximately 480° C., approximately 4 weight percent nickel components, calculated as NiO, approximately 19.5 weight percent tungsten components, calculated as $WO_3$, and approximately 5 weight percent of phosphorus components, calculated as $P_2O_5$, with the remainder being the support.

The second and third catalysts, Catalysts B and C, respectively, are prepared with Support Y in the same manner as Catalyst A. Catalysts B and C have the same weight percentages of nickel components as Catalyst A; however tungsten (calculated as $WO_3$) comprises approximately 18 weight percent of Catalyst B and 36.7 weight percent of Catalyst C, while phosphorus (calculated as $P_2O_5$) comprises approximately 11 weight percent of Catalyst B and approximately 6 weight percent of Catalyst C. Catalysts A and B contain at least 40 percent less moles of tungsten than either the tungsten contained on Catalyst C or the molybdenum contained on the Catalyst R, now to be described.

Two reference catalysts, Catalyst R and X, are prepared with Support Y in the same manner as Catalyst A, except Catalyst R is prepared with an impregnating solution containing molybdenum trioxide, nickel carbonate and phosphoric acid and Catalyst X is prepared without phosphoric acid. The mole ratio of tungsten to nickel in Catalyst A is the same as the mole ratio of molybdenum to nickel in Catalyst R and the final Catalyst R contains approximately 4 weight percent of nickel components (as NiO), 24.5 weight percent of molybdenum components (as $MoO_3$), and 6.8 weight percent of phosphorus components (as $P_2O_5$). In other words, Catalysts C and R contain the same mole amounts of tungsten and molybdenum, respectively. Catalyst X contains approximately 4 weight percent of nickel components (as NiO) and approximately 19.1 weight percent of tungsten components (as $WO_3$)

Three catalysts, K, L and M are prepared with Support Y in the same manner as Catalyst A, except Catalyst L and M are prepared with an impregnating solution additionally containing ammonium fluoride. Catalysts K, L and M each contain approximately 4 weight percent of nickel components, calculated as NiO, approximately 19.7 weight percent of tungsten components, calculated as $WO_3$, and approximately 5 weight percent of phosphorus components, calculated as $P_2O_5$. Also, Catalysts L and M contain approximately 1.5 and 2.0 weight percent of fluoride components, calculated as F, respectively. The porosity characteristics of Catalysts A, B, C, R, and X, are shown in Table II as follows:

ing at 0.7 SCF/hr (one atmosphere pressure). The temperature during the presulfiding is initially at room temperature, is increased gradually until 370° C. is reached and held for 2 hours, and then lowered to 288° C., at which time the catalyst is contacted with the feedstock.

The feedstock is passed downwardly through a reactor vessel and contacted in separate runs with Catalysts A, B, C, R, X, K, L and M in a single-stage, single-pass system with once-through hydrogen. The operating conditions during each run are summarized as follows: 1,200 p.s.i.g. hydrogen pressure (total pressure), 1.0 LHSV, a hydrogen rate of 4,000 SCF/bbl, and temperature of 360° C.

Giving Catalyst R, employed in the reference aromatic saturation hydroprocess, an arbitrary activity of 100, relative activities of Catalysts A, B, C, X, K, L and M for aromatic saturation are determined by calculation and tabulated in comparison to Catalyst R in Table IV. These activity determinations are based on a comparison of the reaction rates for aromatic saturation obtained from data of the experimental run according to the following standard equation which assumes first order kinetics for aromatic saturation:

$$\text{Relative Volume Aromatic Saturation Activity} = \frac{\ln[C_f/C_p]}{\ln[C_{fr}/C_{pr}]} \times 100$$

TABLE II

| Pore Diameter Angstroms | Catalyst A % Pore Vol. | Catalyst B % Pore Vol. | Catalyst C % Pore Vol. | Catalyst R % Pore Vol. | Catalyst X % Pore Vol. |
|---|---|---|---|---|---|
| 40–50 | 2.7 | 3.7 | 6.4 | 0.4 | 0.2 |
| <50 | 3.1 | 4.2 | 7.8 | 1.0 | 0.4 |
| 50–60 | 5.2 | 7.5 | 6.4 | 1.9 | 1.6 |
| 60–70 | 11.6 | 10.8 | 8.1 | 5.1 | 9.0 |
| 70–80 | 45.8 | 53.0 | 16.2 | 10.0 | 42.0 |
| 80–90 | 27.9 | 18.5 | 47.1 | 15.8 | 39.7 |
| >90 | 6.4 | 6.0 | 14.4 | 66.2 | 7.3 |
| 90–100 | 0.9 | 1.2 | 8.4 | 32.8 | 0.8 |
| 100–110 | 0.5 | 0.4 | 0.6 | 23.2 | 0.5 |
| 110–120 | 0.2 | 0.3 | 0.4 | 4.8 | 0.3 |
| 120–130 | 0.3 | 0.1 | 0.3 | 0.4 | 0.3 |
| >130 | 4.5 | 4.0 | 4.7 | 5.0 | 5.4 |
| PORE VOLUME cc/gram (Merc. Poros.) | 0.35 | 0.26 | 0.21 | 0.31 | 0.44 |
| MEDIAN PORE DIAMETER ang. (Merc. Poros.) | 77 | 75 | 81 | 94 | 79 |
| SURFACE AREA $m^2$/gram | 180 | 141 | 109 | 132 | 220 |

The pore size distributions of Catalysts K, L and M are approximately the same as that for Catalyst A.

The catalysts are tested for their activity for aromatic saturation of a hydrocarbon-containing feedstock containing essentially all diesel distillate. The feedstock contains 5680 ppmw of sulfur, calculated as S, 240 ppmw of nitrogen, calculated as N, 29.5 volume percent of aromatic-containing compounds, calculated by Hydrocarbon Types in Liquid Petroleum Products by F.I.A. (Fluorescent Indicator Adsorption, ASTM D-1314), and 13.09 weight percent hydrogen, calculated as H.

The test is conducted by contacting the catalysts in separate runs with the above described feedstock under aromatic saturation conditions. However, at the outset of each run, the respective catalysts are presulfided by contact for about 16 to 20 hours with a gas consisting of 90 volume percent $H_2$ and 10 volume percent $H_2S$ flowwhere $C_{fr}$ and $C_{pr}$ are the respective concentrations of aromatics in the feed and product obtained with the catalyst employed in the reference process and $C_f$ and $C_p$ are the respective concentrations of aromatics in the feed and product obtained with a catalyst being compared to the reference.

The sulfur, nitrogen and aromatic contents in the product hydrocarbon obtained for each catalyst as well as the relative volume aromatic saturation activity are set forth in the following Table IV for the separate runs of equivalent length of time (approximately 100 hours).

TABLE IV

| Catalyst | Arom. Vol. % | RVA | S, ppmw | N, ppmw |
|---|---|---|---|---|
| A(Ni/19.5%$WO_3$/P) | 8.3 | 122 | <5 | ~0.1 |

TABLE IV-continued

| Catalyst | Arom. Vol. % | RVA | S, ppmw | N, ppmw |
|---|---|---|---|---|
| B(Ni/18%WO$_3$/P) | 8.6 | 118 | <5 | ~0.1 |
| C(Ni/36.7%WO$_3$/p) | 9.3 | 110 | <5 | ~0.1 |
| R(Ni/24.4%MoO$_3$/p) | 10.4 | 100 | <5 | ~0.1 |
| X(Ni/19.5%WO$_3$) | 17.1 | 52 | <5 | ~16.5 |
| K(Ni/19.7%WO$_3$/P) | 7.7 | 129 | <5 | ~0.1 |
| L(Ni/19.7%WO$_3$/P/1.5%F) | 5.8 | 157 | <5 | ~0.1 |
| M(Ni/19.7%WO$_3$/P/2.0%F) | 4.5 | 181 | <5 | ~0.1 |

The data in Table IV clearly indicate that Catalysts A, B, C, K, L and M are useful for aromatic saturation of a typical diesel distillate feedstock. In addition, the data obtained evidence the superiority of the processes using Catalysts A, B, C, K, L and M over that of the reference catalyst containing molybdenum and phosphorus and the reference tungsten-containing catalyst without phosphorus. Based on the data in Table IV, the Catalysts A, B, C, K, L and M are superior to the reference catalysts for saturating aromatics.

Furthermore, the data in Table IV indicate that the fluoride-containing catalysts, Catalysts L and M, have superior activity properties for promoting aromatic saturation reactions than those of the other catalysts. The catalytic aromatic saturation properties of Catalysts L and M are particularly superior to those properties of the closest comparable catalysts, Catalysts A and K, which are otherwise approximately the same as Catalysts L and M, except lack the fluoride components. Aromatic saturation processes catalyzed by Catalysts L and M exhibit markedly superior results compared to those processes catalyzed with Catalysts A and K, i.e., 157 and 181 RVA for L and M vs. 122 and 129 for A and K, and conversion to 5.8 and 4.5 vol. % aromatics for L and M vs. 8.3 and 7.7 vol. % aromatics for A and K.

Moreover, if the RVA of Catalyst K is arbitrarily assigned the value of 100, Catalyst L is calculated to be 121 and Catalyst M is 140. Accordingly, greater than about 1.5, and preferably greater than about 2.0 weight percent of fluoride components on a nickel/tungsten/phosphorus/porous refractory oxide-supported catalyst imparts a markedly improved aromatic saturation property to the catalyst, i.e., an increase of about 40 percent.

Although the invention has been described in conjunction with its preferred embodiment and examples, many variations, modifications, and alternatives will be apparent to those skilled in the art. For example, although the foregoing catalysts were described in relation to their particular usefulness for aromatic saturation, it is clear from the discoveries in the present invention that such catalysts may also be used for hydroprocessing, including hydrodesulfurization, hydrodenitrogenation, and the like, either alone or in conjunction with conventional small pore hydrocracking catalysts (i.e., catalysts containing zeolitic and/or nonzeolitic molecular sieves having pore sizes having diameters less than about 20 angstroms). Accordingly, it is intended to embrace within the invention all such variations, modifications, and alternatives as fall within the spirit and scope of the appended claims.

We claim:

1. A process for saturating aromatic compounds contained in a hydrocarbon-containing feedstock comprising at least 10 volume percent of compounds and at least about 90 volume percent of feedstock components boiling at less than about 371° C., said process comprising contacting in a reactor said feedstock under aromatic saturation conditions including an elevated temperature and a pressure at the inlet of said reactor less than 700 p.s.i.g. and the presence of hydrogen with a particulate catalyst comprising at least one hydrogenation component and at least one fluoride component supported on a porous refractory oxide, to produce a product containing more saturated forms of said aromatic compounds contained in said feedstock.

2. The process defined in claim 1 wherein said particulate catalyst consists essentially of at least one nickel component, at least one tungsten component, at least one phosphorus component and at least one fluoride component on a support comprising gamma alumina.

3. The process defined in claim 1 wherein said hydrogenation component comprises at least one Group VIB metal component selected from the group consisting of molybdenum and tungsten and/or at least one Group VIII metal component selected from the group consisting of cobalt and nickel.

4. The process defined in claim 3 wherein said particulate catalyst further comprises at least one phosphorus component.

5. The process defined in claim 3 wherein said catalyst is essentially free of supported phosphorus components.

6. The process defined in claim 1 wherein said fluoride component comprises at least about 1.0 weight percent of said particulate catalyst.

7. The process defined in claim 1 wherein said particulate catalyst being essentially free of a crystalline support material.

8. The process defined in claim 1 wherein at least about 50 ppmw of one or more additive fluoride-containing compounds, calculated as F, is added to said feedstock prior to said feedstock contacting said particulate catalyst.

9. The process defined in claim 8 wherein said additive fluoride-containing compounds comprises an organofluorine compound.

10. The process defined in claim 1 wherein about 150 to about 800 ppmw of one or more additive fluoride-containing compounds, calculated as F, is added to said feedstock prior to said feedstock contacting said particulate catalyst.

11. The process defined in claim 1 wherein said particulate catalyst further comprising a crystalline support material.

12. The process defined in claim 1 wherein said particulate catalyst has a pore size distribution wherein at least 75 percent of the pore volume is in pores of diameter in the range from about 50 angstroms to about 130 angstroms and less than 10 percent of said pore volume in pores of diameter greater than 130 angstroms.

13. The process defined in claim 1 wherein said particulate catalyst has less than 15 percent of the total pore volume in pores of diameter greater than 90 angstroms.

14. The process defined in claim 1 wherein said particulate catalyst has a median pore diameter in the range from about 60 to about 95 angstroms.

15. The process defined in claim 1 wherein said conditions include a hydrogen partial pressure greater than about 350 to less than about 650 p.s.i.g. and said temperature is in the range from about 250° C. to about 382° C.

16. The process defined in claim 1 wherein said feedstock contains nitrogen and said process further comprises simultaneous denitrogenation of said feedstock.

17. The process defined in claim 1 wherein said feedstock contains sulfur and said process further comprises simultaneous desulfurization of said feedstock.

18. The process defined in claim 1 wherein said feedstock comprises an aromatic-containing diesel fraction boiling substantially in the range from 140° C. to 370° C.

19. The process defined in claim 1 wherein said conditions effect substantially no cracking of said aromatic compounds contained in said feedstock.

20. The process defined in claim 1 wherein the boiling point ranges of said feedstock and said product are substantially the same.

21. The process defined in claim 1 wherein said feedstock comprises about 20 to about 60 volume percent of aromatic compounds.

22. A process for saturating aromatic compounds contained in a hydrocarbon-containing feedstock comprising at least 10 volume percent of aromatic compounds and at least about 90 volume percent of feedstock components boiling at less than about 371° C., said process comprising contacting said feedstock in a reactor under aromatic saturation conditions, including an elevated temperature and a pressure of the inlet of said reactor in the range from greater than 300 to less than 800 p.s.i.g. and the presence of hydrogen and in the presence of at least one additive fluoride-containing compound, with a particulate catalyst comprising at least one Group VIII metal hydrogenation component and/or at least one Group VIB metal hydrogenation component supported on a porous refractory oxide, said conditions yielding at least about 10 percent conversion of said aromatic compounds in said feedstock to product components containing more saturated forms of said aromatic compounds.

23. The process defined in claim 22 wherein said particulate catalyst consists essentially of at least one nickel component, at least one tungsten component and at least one phosphorus component on a support comprising gamma alumina.

24. The process defined in claim 22 wherein said particulate catalyst further comprises at least one phosphorus component and said additive fluoride-containing compound comprises at least about 50 ppmw of fluoride, calculated as F, of said feedstock.

25. The process defined in claim 22 wherein said conditions include a hydrogen partial pressure greater than about 350 to less than about 650 p.s.i.g. and said temperature less than about 400° C.

26. The process defined in claim 22 wherein said feedstock contains nitrogen and said process further comprises simultaneous denitrogenation of said feedstock.

27. The process defined in claim 22 wherein said feedstock contains sulfur and said process further comprises simultaneous desulfurization of said feedstock.

28. The process defined in claim 22 wherein said catalyst is essentially free of a crystalline molecular sieve and has less than 10 percent of the total pore volume in pores of diameter greater than 110 angstroms and the median pore diameter is in the range from about 60 to about 100 angstroms.

29. The process defined in claim 22 wherein said feedstock comprises an aromatic-containing diesel fraction boiling substantially in the range from 140° C. to 370° C.

30. The process defined in claim 22 wherein said catalyst further comprises at least one fluoride component.

31. The process defined in claim 22 wherein said feedstock is contacted with said fluoride-containing component prior to said feedstock contacting said catalyst.

32. The process defined in claim 22 wherein said catalyst further comprises a crystalline molecular sieve.

33. The process defined in claim 22 wherein said feedstock comprises about 20 to about 60 volume percent of aromatic compounds.

34. A process for saturating aromatic compounds contained in a hydrocarbon-containing feedstock comprising at least about 90 volume percent of feedstock components boiling at less than about 371° C., said process comprising contacting said feedstock in a reactor in the presence of at least one fluoride-containing compound, or precursor thereof, under conditions of elevated temperature and a pressure at the inlet of said reactor less than 700 p.s.i.g. and the presence of hydrogen, with a particulate catalyst comprising at least one active nickel hydrogenation metal component, at least one active tungsten hydrogenation metal component and at least one phosphorus component on an amorphous porous refractory oxide, said catalyst having a pore size distribution wherein at least 75 percent of the pore volume is in pores of diameter in the range from about 50 angstroms to about 130 angstroms and less than 10 percent of said pore volume in pores of diameter greater than 130 angstroms, said conditions yielding at least about 10 volume percent conversation of said aromatic compounds in said feedstock to product components containing more saturating forms of said aromatic compounds.

35. The process defined in claim 34 wherein said conditions include a hydrogen partial pressure less than about 650 p.s.i.g. and a temperature less than about 400° C.

36. The process defined in claim 34 wherein said feedstock contains nitrogen and said process further comprises simultaneous denitrogenation of said feedstock.

37. The process defined in claim 34 wherein said feedstock contains sulfur and said process further comprises simultaneous desulfurization of said feedstock.

38. The process defined in claim 34 wherein said catalyst is essentially free of a crystalline molecular sieve and has less than 10 percent of the total pore volume in pores of diameter greater than 110 angstroms and the median pore diameter is in the range from about 60 to about 100 angstroms.

39. The process defined in claim 34 wherein said feedstock comprises an aromatic-containing diesel fraction boiling substantially in the range from 140° C. to 370° C.

40. The process defined in claim 34 wherein said catalyst comprises said fluoride-containing compound.

41. The process defined in claim 34 wherein said feedstock is contacted with said fluoride-containing compound prior to said feedstock contacting said particulate catalyst.

42. The process defined in claim 41 wherein a first feedstock containing sulfur or nitrogen components is hydrodesulfurized or hydrodenitrogenated prior to contacting said feedstock with said fluoride-containing compound.

43. The process defined in claim 34 wherein said feedstock and said product contain homocyclic aromatic compounds and the average molecular weight of said homocyclic aromatics contained in said feedstock is increased by about 0.1 to about 5 percent compared to that in said product.

44. A catalytic process for saturating aromatic compounds contained in a feed stock comprising a diesel fraction boiling substantially in the range from about 140° C. to about 370° C. and containing at least 10 volume percent of aromatic compounds, said process comprising contacting said feedstock with a catalyst comprising at least one molybdenum or tungsten metal component, a nickel metal component, a phosphorus component, and a fluoride component, on an amorphous porous refractory oxide-containing gamma alumina, said catalyst having a pore size distribution wherein at least 75 percent of the total pore volume is in pores of diameter in the range from 50 angstroms to 130 angstroms, the median pore diameter is from about 60 to about 100 angstroms, and at least 50 percent of the total pore volume is in pores of diameter in the range from about 20 angstroms above to about 20 angstroms below said median pore diameter, under aromatic saturation conditions to produce a product containing more saturated forms of said aromatic compounds contained in said feedstock.

* * * * *

UNITED STATES PATENT AND TRADEMARK OFFICE
CERTIFICATE OF CORRECTION

PATENT NO. : 5,290,429

DATED : March 1, 1994

INVENTOR(S) : Dennis D. Delaney and John W. Ward

It is certified that error appears in the above-identified patent and that said Letters Patent is hereby corrected as shown below:

Claim 1, column 17, line 65, after "of" insert -- aromatic --.

Signed and Sealed this

Fifth Day of July, 1994

Attest:

BRUCE LEHMAN

Attesting Officer

Commissioner of Patents and Trademarks